US008140505B1

(12) United States Patent
Jain et al.

(10) Patent No.: US 8,140,505 B1
(45) Date of Patent: Mar. 20, 2012

(54) NEAR-DUPLICATE DOCUMENT DETECTION FOR WEB CRAWLING

(75) Inventors: Arvind Jain, Sunnyvale, CA (US); Gurmeet Singh Manku, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1868 days.

(21) Appl. No.: 11/094,791

(22) Filed: Mar. 31, 2005

(51) Int. Cl.
 *G06F 17/30* (2006.01)
(52) U.S. Cl. .................................. 707/706; 707/736
(58) Field of Classification Search .................... None
 See application file for complete search history.

(56) References Cited

U.S. PATENT DOCUMENTS

| | | | |
|---|---|---|---|
| 5,745,900 A * | 4/1998 | Burrows | 707/102 |
| 5,845,005 A | 12/1998 | Setlak et al. | 382/124 |
| 6,230,155 B1 | 5/2001 | Broder et al. | 707/3 |
| 6,286,006 B1 * | 9/2001 | Bharat et al. | 707/5 |
| 6,351,755 B1 * | 2/2002 | Najork et al. | 715/501.1 |
| 6,393,438 B1 | 5/2002 | Kathrow | 707/203 |
| 6,658,423 B1 * | 12/2003 | Pugh et al. | 707/102 |
| 2002/0133499 A1 | 9/2002 | Ward et al. | 707/102 |
| 2003/0105716 A1 | 6/2003 | Sutton et al. | 705/50 |
| 2003/0208761 A1 * | 11/2003 | Wasserman et al. | 725/53 |
| 2005/0210043 A1 * | 9/2005 | Manasse | 707/100 |
| 2006/0036684 A1 * | 2/2006 | Schwerk | 709/204 |

OTHER PUBLICATIONS

Wilkerson et al. "Winnowing: Local Algorithms for Document Fingerprinting", SIGMOD 2003, Jun. 9-12, 2003, p. 76.85.*

Arvind Arasu et al.; Extracting Structured Data from Web Pages; Proceedings of the ACM SIGMOD 2003,; 30 pages.
Brenda S. Baker; A Theory of Parameterized Pattern Matching: Algorithms and Applications (Extended Abstract); $25^{th}$ ACM STOC 1993; pp. 71-80.
Brenda S. Baker; On Finding Duplication and Near-Duplication in Large Software Systems; Proceedings of the $2^{nd}$ Working Conference on Reverse Engineering; 1995; 10 pages.
Andrei Z. Broder; On the Resemblance and Containment of Documents; Proceedings of the Compression and Complexity of Sequences; 1997; pp. 1-9.
Krishna Bharat et al.; Mirror, Mirror on the Web: A Study of Host Pairs of Replicated Content; Proceedings of the $8^{th}$ International Conference on World Wide Web (WWW 1999); 17 pages.
Krishna Bharat et al.; A Comparison of Techniques to Find Mirrored Hosts on the WWW; Journal of the American Society for Information Science; 2000; 11 pages.
Krishna Bharat; The Connectivity Server: Fast Access to Linkage Information on the Web; Proceedings of the $7^{th}$ International Conference on the World Wide Web; 1998; 13 pages.
Andrei Z. Broder et al.; Min-Wise Independent Permutations; Proceedings of STOC; 1998; pp. 630-659.

(Continued)

*Primary Examiner* — Charles Rones
*Assistant Examiner* — Yuk Ting Choi
(74) *Attorney, Agent, or Firm* — Harrity & Harrity, LLP

(57) ABSTRACT

A system generates a hash value for a fetched document and compares the hash value with a set of stored hash values to identify ones of the stored hash values with a sequence of bit positions, less than all of the bit positions, that match a corresponding sequence of bit positions of the hash value. The system also determines whether any of the identified hash values are substantially similar to the hash value and identify the fetched document as a near-duplicate of another document when one of the identified hash values is substantially similar to the hash value.

27 Claims, 13 Drawing Sheets

OTHER PUBLICATIONS

Sergey Brin et al.; Copy Detection Mechanisms for Digital Documents; Proceedings of the ACM SIGMOD Annual Conference, 1995; 12 pages.

Andrei Z. Broder et al.; Syntactic Clustering of the Web; Proceedings of WWW6, 1997; 13 pages.

James W. Cooper et al.; Detecting Similar Documents Using Salient Terms; Proceedings of the CIKM 2002; Nov. 2002; pp. 245-251.

Edith Cohen et al.; Finding Interesting Associations without Support Pruning; Proceedings of the 16th ICDE; 2000; 12 pages.

Abdur Chowdhury et al.; Collection Statistics for Fast Duplicate Document Detection; ACM Transactions on Information Systems; vol. 20, No. 2; Apr. 2002; pp. 171-191.

Zhiyuan Chen et al.; Selectively Estimation for Boolean Queries; Proceedings of PODS 2000; 10 pages.

Jack G. Conrad et al.; Constructing a Text Corpus for Inexact Duplicate Detection; SIGIR 2004; Jul. 2004; pp. 582-583.

Scott Deerwester et al.; Indexing by Latent Semantic Analysis; Journal of the American Society for Information Science; 1990; 34 pages.

Jeffrey Dean et al.; Finding Related Pages in the World Wide Web; Proceedings of the Eighth International World Wide Web Conference; 1999; pp. 1-15.

Aristides Gionis et al.; Efficient and Tunable Similar Set Retrieval; Proceedings of SIGMOD 2001; 12 pages.

Taher H. Haveliwala et al.; Scalable Techniques for Clustering the Web; Proceedings of the 3rd International Workshop on the Web and Databases (WebDB 2000); 6 pages.

Taher H. Haveliwala et al.; Evaluating Strategies for Similarity Search on the Web; Proceedings of the 11th International World Wide Web Conference; May 2002; 11 pages.

Khaled M. Hammouda et al.; Efficient Phrase-Based Document Indexing for Web Document Clustering; IEEE Transactions on Knowledge and Data Engineering; vol. 16, No. 10, Oct. 2004; pp. 1279-1296.

Timothy C. Hoad et al.; Methods for Identifying Versioned and Plagiarised Documents; Journal of the American Society for Information Science and Technology; 2003; pp. 1-18.

Sachindra Joshi et al.; A Bag of Paths Model for Measuring Structural Similarity in Web Documents; Proceedings of the 9th ACM International Conference on Knowledge Discovery and Data Mining (SIGKDD 2003); Aug. 2003; pp. 577-582.

Jon M. Kleinberg; Authoritative Sources in a Hyperlinked Environment; Journal of the ACM; 1999; 34 pages.

Aleksander Kotcz et al.; Improved Robustness of Signature-Based Near-Replica Detection via Lexicon Randomization; SIGKDD 2004; Aug. 2004; 6 pages.

Ravi Kumar et al.; Trawling the Web for Emerging Cyber-Communities; Computer Networks: The International Journal of Computer and Telecommunications Networks; 1999; 21 pages.

Udi Manber; Finding Similar Files in a Large File System; Proceedings of the 1994 USENIX Conference; 1994; 11 pages.

Athicha Muthitacharoen et al.; A Low-Bandwidth Network File System; Proceedings of the 18th ACM Symposium on Operating System Principles (SOSP 2001); 14 pages.

Sean Quinlan et al.; Venti: A new Approach to Archival Storage; First USENIX Conference on File and Storage Technologies; 2002; 13 pages.

Narayanan Shivakumar et al.; SCAM: A Copy Detection Mechanism for Digital Documents; Proceedings of the 2nd International Conference on Theory and Practice of Digital Libraries; 1995; 9 pages.

Saul Schleimer; Winnowing: Local Algorithms for Document Fingerprinting; Proceedings of SIGMOD 2003; Jun. 9-12, 2003; 10 pages.

Moses S. Charikar; Similarity Estimation Techniques from Rounding Algorithms; STOC 2002; May 19-21, 2002; 9 pages.

Gautam Pant et al.; Crawling the Web; 2003; 25 pages.

Andrei Broder et al.; Syntactic Clustering the Web; http://research.compaq.com/src/articles/199707/cluster.html; Systems Research Center, Palo Alto, California; Feb. 4, 2004 (print date); 5 pages.

Michael O. Rabin; Fingerprinting by Random, Polynomials; Technical Report TR-15-81; Harvard University, 1981; 14 pages.

Shioupyn Shen.; U.S. Appl. No. 10/808,326, filed Mar. 25, 2004; "Document Near-Duplicate Detection"; 33 pages.

* cited by examiner

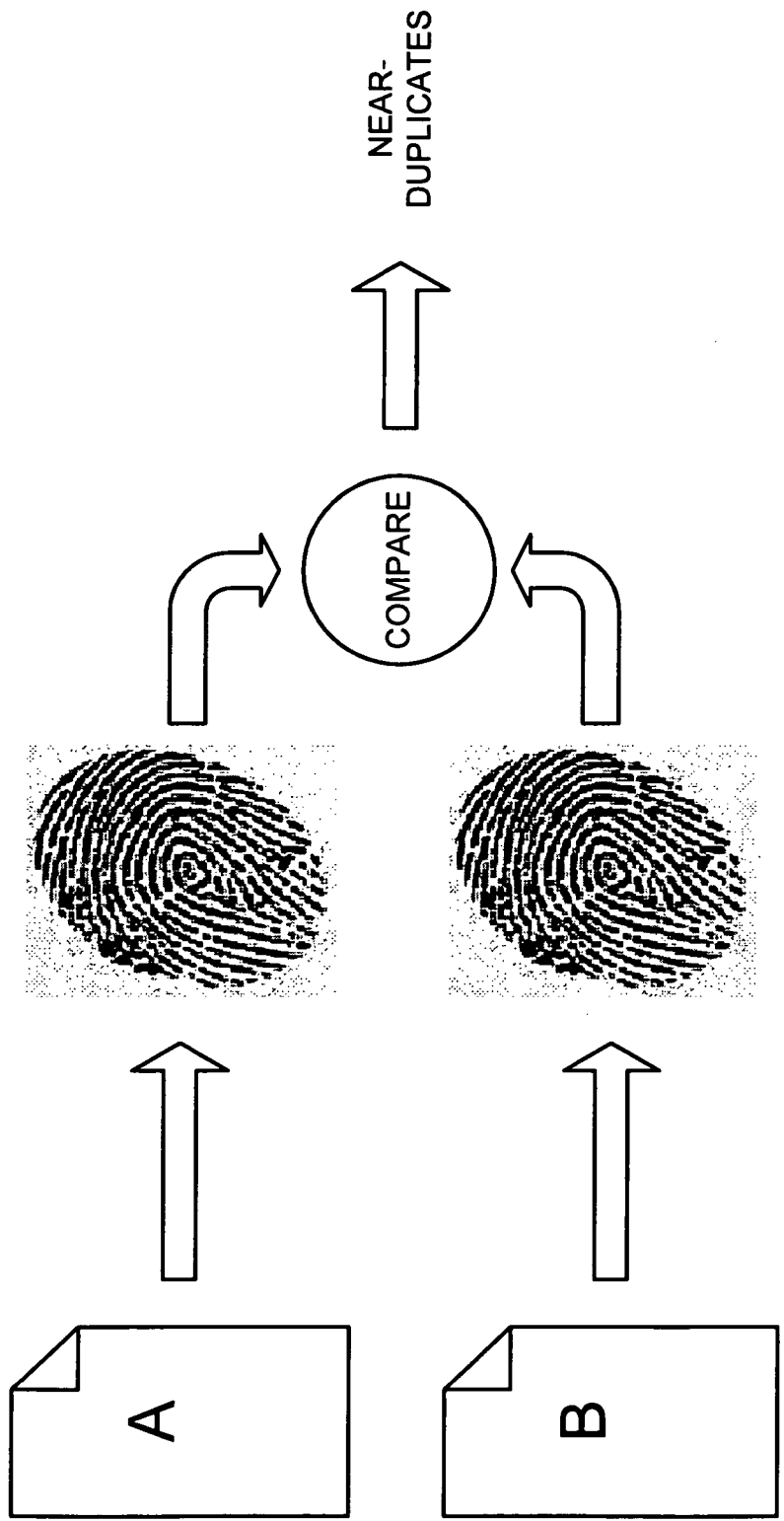

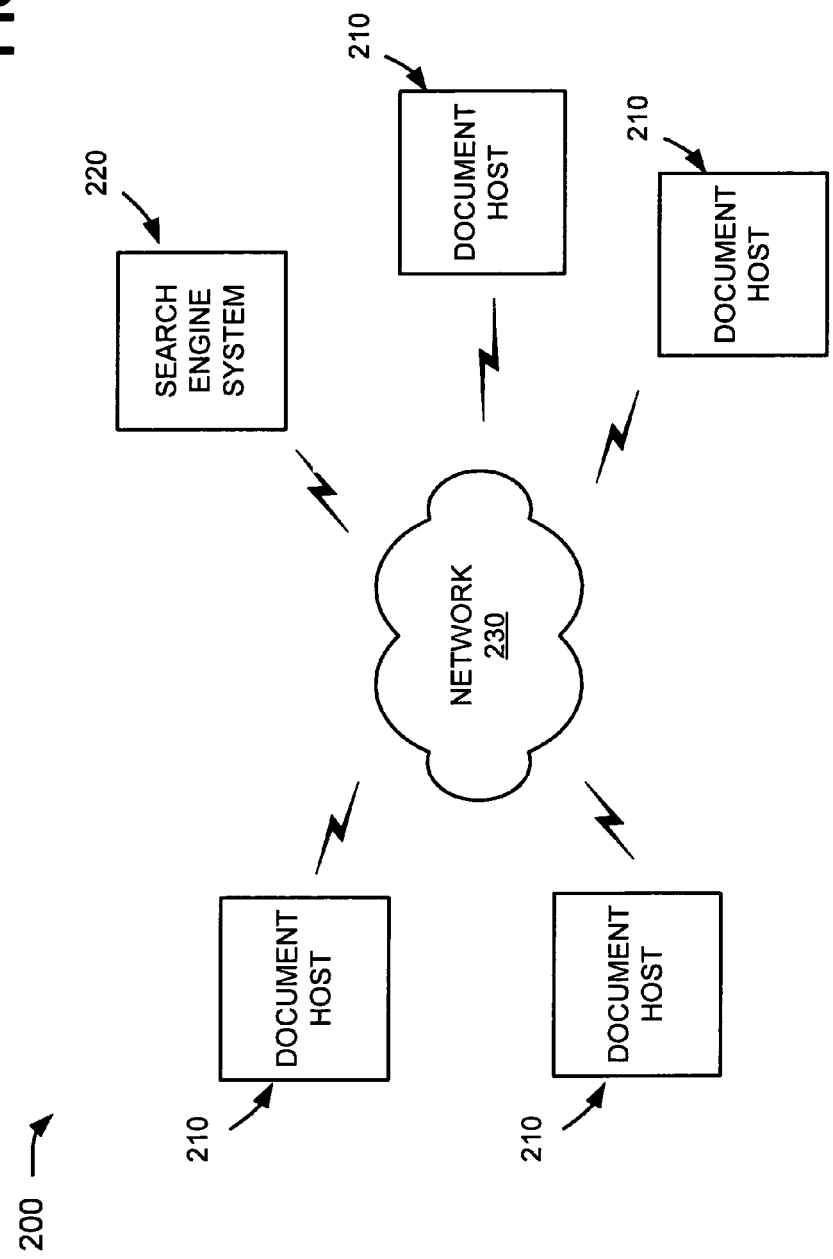

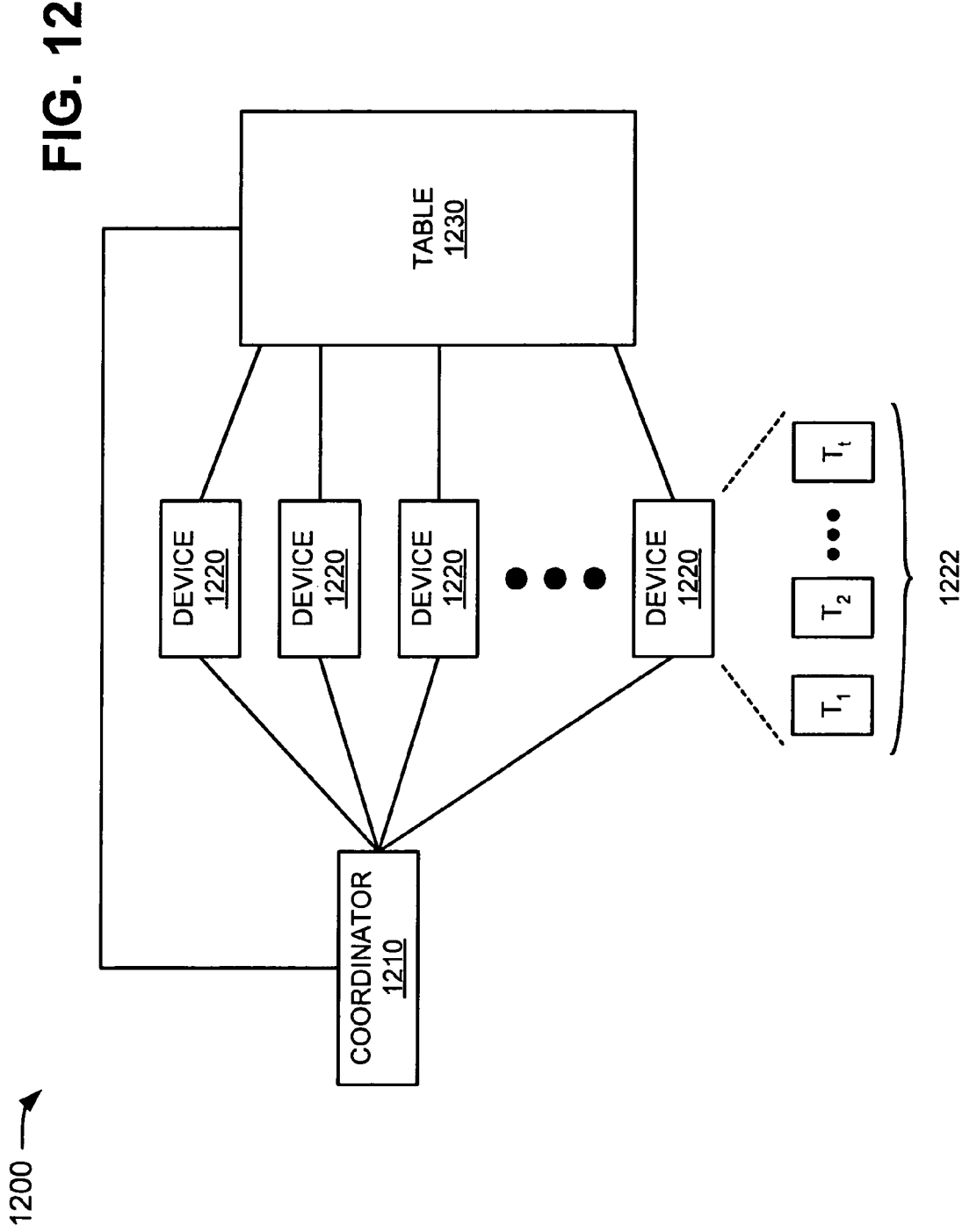

NEAR-DUPLICATE DOCUMENT DETECTION FOR WEB CRAWLING

BACKGROUND

1. Field of the Invention

Implementations described herein relate generally to information retrieval and, more particularly, to the detection and processing of near-duplicate documents when crawling a network.

2. Description of Related Art

The World Wide Web ("web") contains a vast amount of information that is ever-changing. Existing web-based information retrieval systems use web crawlers to identify information on the web. A web crawler is a program that exploits the link-based structure of the web to browse the web in a methodical, automated manner.

A web crawler may start with addresses (e.g., URLs) of links to visit. For each address on the list, the web crawler may visit the document associated with the address. The web crawler may identify outgoing links within the visited document and add addresses associated with these links to the list of addresses.

A problem that web crawlers face is how to handle near-duplicate content on the web. For example, the same document may appear duplicated or substantially duplicated in different forms or at different places on the web. There are many sources of near-duplicate documents on the web. One source of near-duplicates includes documents that are "mirrored" at different sites on the web. Mirroring may be used to alleviate potential delays when many users attempt to access the same document at the same time and/or to minimize network latency (e.g., by caching web documents locally).

Another source of near-duplicates includes documents that have different versions with different formatting. For example, a document may have plain text and hypertext markup language (HTML) versions so that users can render or download the content in a form that they prefer. As additional types of devices are used to access the web (e.g., computers, mobile phones, personal digital assistants, etc.), a given document may have even more versions with different formatting (text only, text plus other media, etc.).

Yet another source of near-duplicates includes documents that are pre-pended or appended with information related to its location on the web, the date, the date it was last modified, a version, a title, a hierarchical classification path (e.g., a document may be classified under more than one class within the hierarchy of a web site), etc. A further source of near-duplicates includes documents that are generated from existing documents using a consistent word replacement. For example, a web site may be "re-branded" for different audiences by using word replacement. Another source of near-duplicates includes documents that aggregate or incorporate content available from other sources on the web. Yet other sources of near-duplicates may exist.

Because a near-duplicate document typically includes near-duplicate links, it may be beneficial for a web crawler to ignore the links in a near-duplicate document so as not to waste computer, storage, and/or network resources.

SUMMARY

According to one aspect, a system may include means for generating a hash value for a fetched document; means for comparing the hash value with a set of stored hash values to identify ones of the stored hash values with a sequence of bit positions, less than all of the bit positions, that match a corresponding sequence of bit positions of the hash value; means for determining whether any of the identified hash values are substantially similar to the hash value; and means for identifying the fetched document as a near-duplicate of another document when one of the identified hash values is substantially similar to the hash value.

According to another aspect, a system may include a memory and a processor. The memory may store a set of fingerprints associated with a set of previously-crawled documents. The processor may crawl a document, generate a fingerprint for the crawled document, determine whether bits associated with one of the fingerprints in the memory differ from bits associated with the fingerprint in at most k bit positions, where k is an integer greater than zero, and identify the crawled document as a near-duplicate of one of the previously-crawled documents corresponding to the one of the fingerprints when bits associated with the one of the fingerprints differ from bits associated with the fingerprint in at most k bit positions.

According to yet another aspect, a system may include a first table, a coordinator, and a group of devices. The first table may store a group of fingerprints associated with a group of documents. The coordinator may receive a group of new documents, determine fingerprints for the new documents, and broadcast the fingerprints. The group of devices may receive the broadcast fingerprints and maintain the first table. Each of the devices may create a second table based on the broadcast fingerprints, determine whether a fingerprint in a set of the fingerprints from the first table is substantially similar to one of the broadcast fingerprints in the second table, and identify the one of the broadcast fingerprints as being associated with a near-duplicate document when a fingerprint in the set of the fingerprints from the first table is substantially similar to the one of the broadcast fingerprints in the second table.

BRIEF DESCRIPTION OF THE DRAWINGS

The accompanying drawings, which are incorporated in and constitute a part of this specification, illustrate one or more embodiments of the invention and, together with the description, explain the invention. In the drawings, FIGS. 1A and 1B are exemplary diagrams illustrating concepts consistent with the principles of the invention;

FIG. 2 is an exemplary diagram of a network in which systems and methods consistent with the principles of the invention may be implemented;

FIG. 12 is an exemplary diagram of a batch mode processing system according to an implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention.

Overview

In the description to follow, reference will be made to various "documents" and "links." A "document," as the term is used herein, is to be broadly interpreted to include any machine-readable and machine-storable work product. A document may include, for example, an e-mail, a web site, a business listing, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

In the context of web crawling, the presence of near-duplicate documents may pose problems by wasting resources (e.g., computer, storage, and/or network resources). As used herein, a "near-duplicate" document may refer to a document whose content is an exact duplicate, a substantial duplicate, or similar to the content of another document.

Systems and methods consistent with the principles of the invention may identify near-duplicate documents to make web crawling more efficient. For example, a small-sized fingerprint may be determined for each crawled document. As used herein, a "fingerprint" may refer to a value, such as a hash value. In one implementation, the fingerprint may have a property that near-duplicate documents have most of the bits in their fingerprints in common. After a new document is crawled, its fingerprint may be determined. If the fingerprint matches some existing fingerprint in most or all of the bits, the document may be discarded and/or the outgoing links of the document may be ignored and not crawled.

Figure 1B:
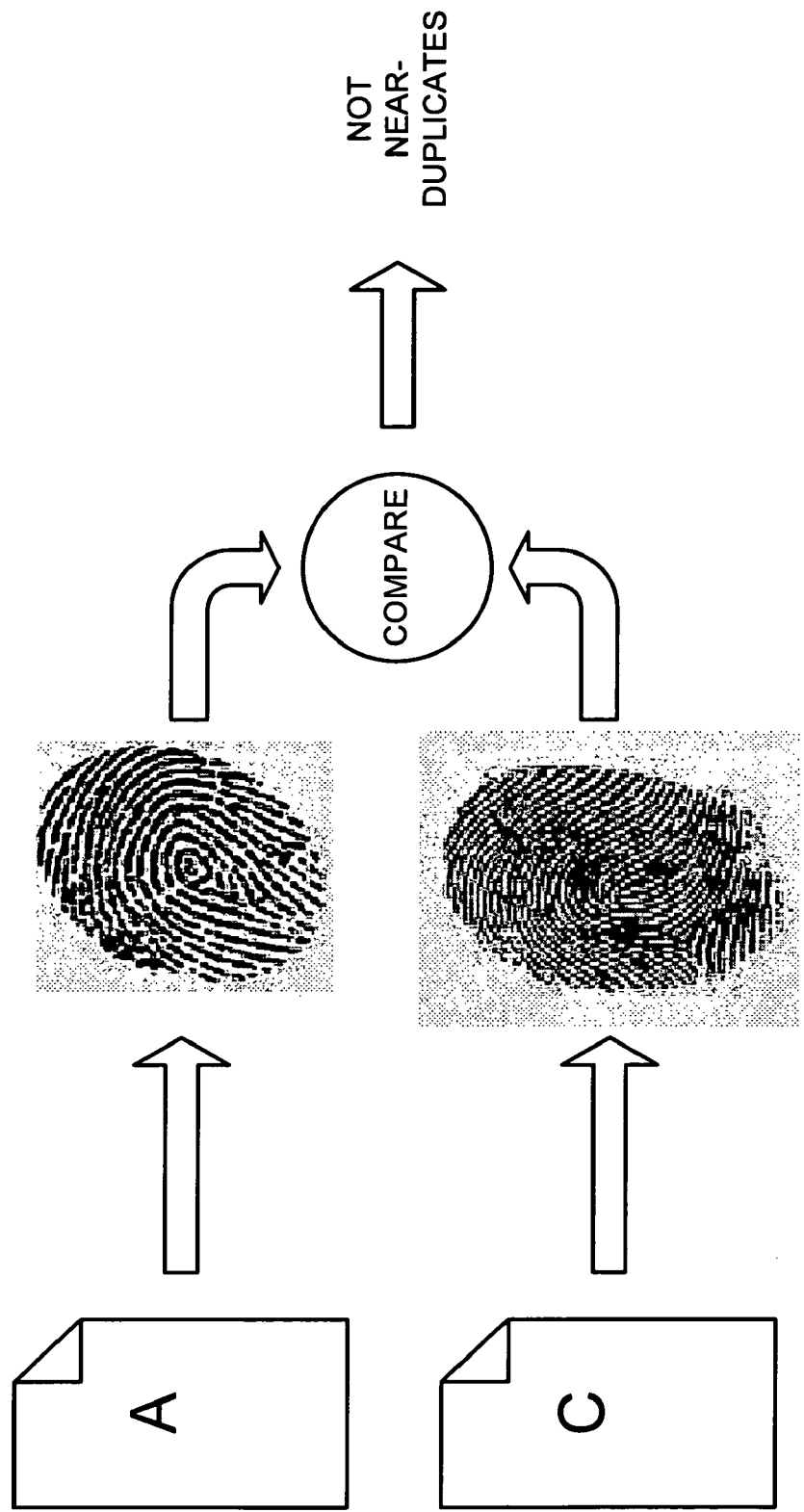

FIGS. 1A and 1B are exemplary diagrams illustrating concepts consistent with the principles of the invention. As shown in FIG. 1A, documents A and B are near-duplicate documents. For example, assume that documents A and B differ from each other in only a small portion of the documents, such as in one or more advertisements, timestamps, and/or outgoing links that the documents contain. Documents A and B may be processed to determine their fingerprints. Assume that document A is a newly crawled document and document B has been previously crawled and its fingerprint previously determined and stored. Because documents A and B are near-duplicates, their corresponding fingerprints are similar. As a result, when the fingerprints are compared, it may be determined that documents A and B are near-duplicates. In this case, document A may be discarded and/or the outgoing links in document A may be ignored and not crawled.

As shown in FIG. 1B, documents A and C are not near-duplicate documents. For example, assume that documents A and C differ substantially from each other. Documents A and C may be processed to determine their fingerprints. Assume that document A is a newly crawled document and document C has been previously crawled and its fingerprint previously determined and stored. Because documents A and C are not near-duplicates, their corresponding fingerprints differ. As a result, when the fingerprints are compared, it may be determined that documents A and C are not near-duplicates. In this case, the outgoing links in document A may be extracted and crawled.

Exemplary Network Configuration

FIG. 2 is an exemplary diagram of a network 200 in which systems and methods consistent with the principles of the invention may be implemented. Network 200 may include multiple document hosts 210 connected to a search engine system 220 via a network 230. Four document hosts 210 and a single search engine system 220 have been illustrated as connected to network 230 for simplicity. In practice, there may be more or fewer document hosts 210 and/or search engine systems 220.

Document hosts 210 may include entities that store and/or manage documents. An entity may be defined as a device, such as a wireless telephone, a personal computer, a personal digital assistant (PDA), a lap top, or another type of computation or communication device, a thread or process running on one of these devices, and/or an object executable by one of these devices.

Search engine system 220 may include an entity that crawls, processes, searches, and/or maintains documents in a manner consistent with the principles of the invention. For example, search engine system 220 may crawl a corpus of documents (e.g., web documents), index the documents, store information associated with the documents in a repository of documents, and/or search the repository based on user search queries. While search engine system 220 is shown as a single entity, it may be possible for search engine system 220 to be implemented as two or more separate (and possibly distributed) entities.

Network 230 may include a local area network (LAN), a wide area network (WAN), a telephone network, such as the Public Switched Telephone Network (PSTN), an intranet, the Internet, a memory device, or a combination of networks. Document hosts 210 and search engine system 220 may connect to network 230 via wired, wireless, and/or optical connections.

Exemplary Search Engine System Architecture

Figure 3:
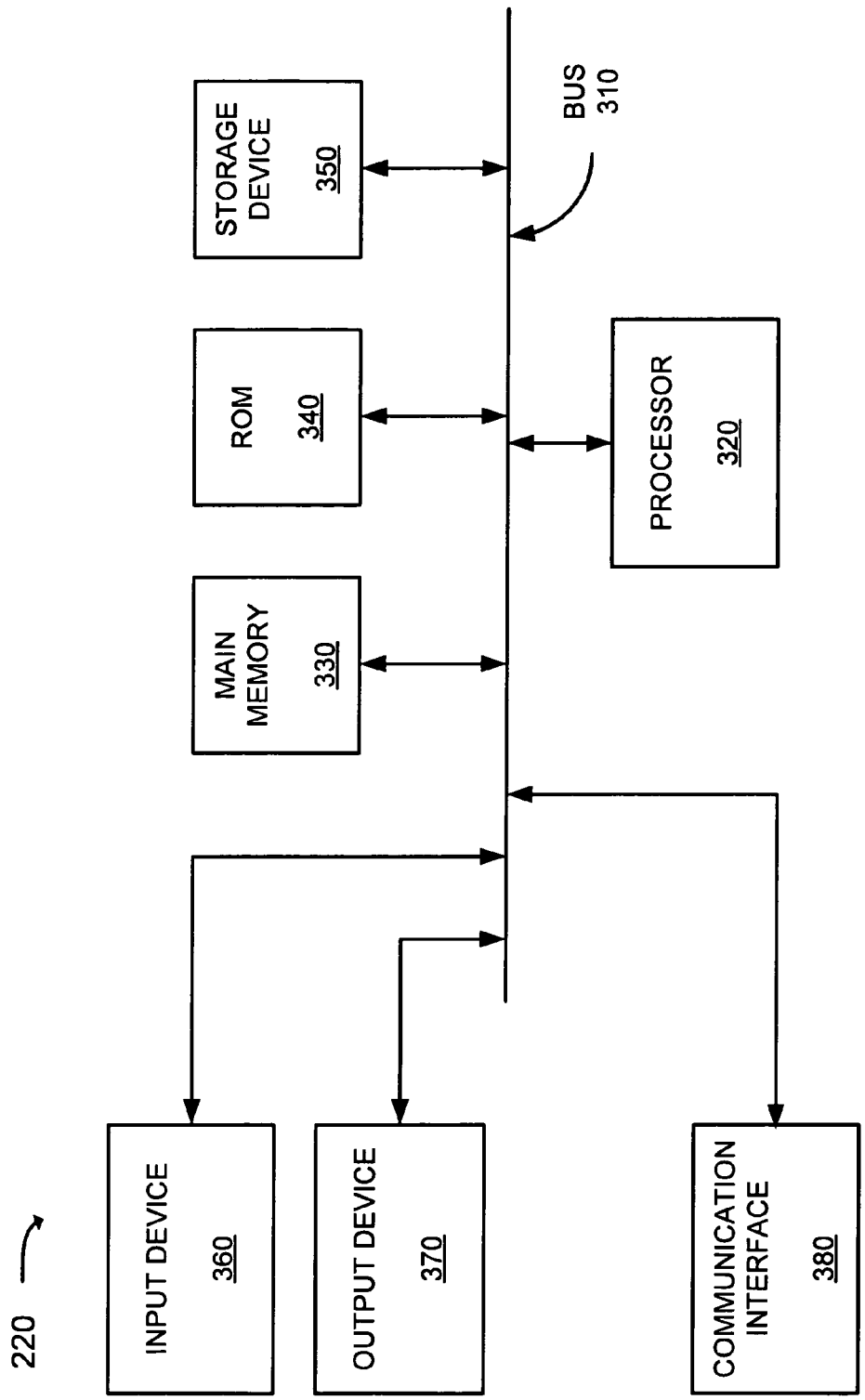
FIG. 3 is an exemplary diagram of the search engine system of FIG. 2 according to an implementation consistent with the principles of the invention.

FIG. 3 is an exemplary diagram of search engine system 220 according to an implementation consistent with the principles of the invention. Search engine system 220 may include a bus 310, a processor 320, a main memory 330, a read only memory (ROM) 340, a storage device 350, an input device 360, an output device 370, and a communication interface 380. Bus 310 may include a path that permits communication among the elements of search engine system 220.

Processor 320 may include a conventional processor, microprocessor, or processing logic that may interpret and execute instructions. Main memory 330 may include a random access memory (RAM) or another type of dynamic storage device that may store information and instructions for execution by processor 320. ROM 340 may include a conventional ROM device or another type of static storage device that may store static information and instructions for use by processor 320. Storage device 350 may include a magnetic and/or optical recording medium and its corresponding drive.

Input device 360 may include a conventional mechanism that permits an operator to input information to search engine system 220, such as a keyboard, a mouse, a pen, voice recognition and/or biometric mechanisms, etc. Output device 370 may include a conventional mechanism that outputs information to the operator, including a display, a printer, a speaker, etc. Communication interface 380 may include any transceiver-like mechanism that enables search engine system 220 to communicate with other devices and/or systems. For example, communication interface 380 may include mechanisms for communicating with another device or system via a network, such as network 230.

Search engine system 220, consistent with the principles of the invention, may perform certain operations, as will be described in detail below. Search engine system 220 may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Functional Diagram of Search Engine System

Figure 4:
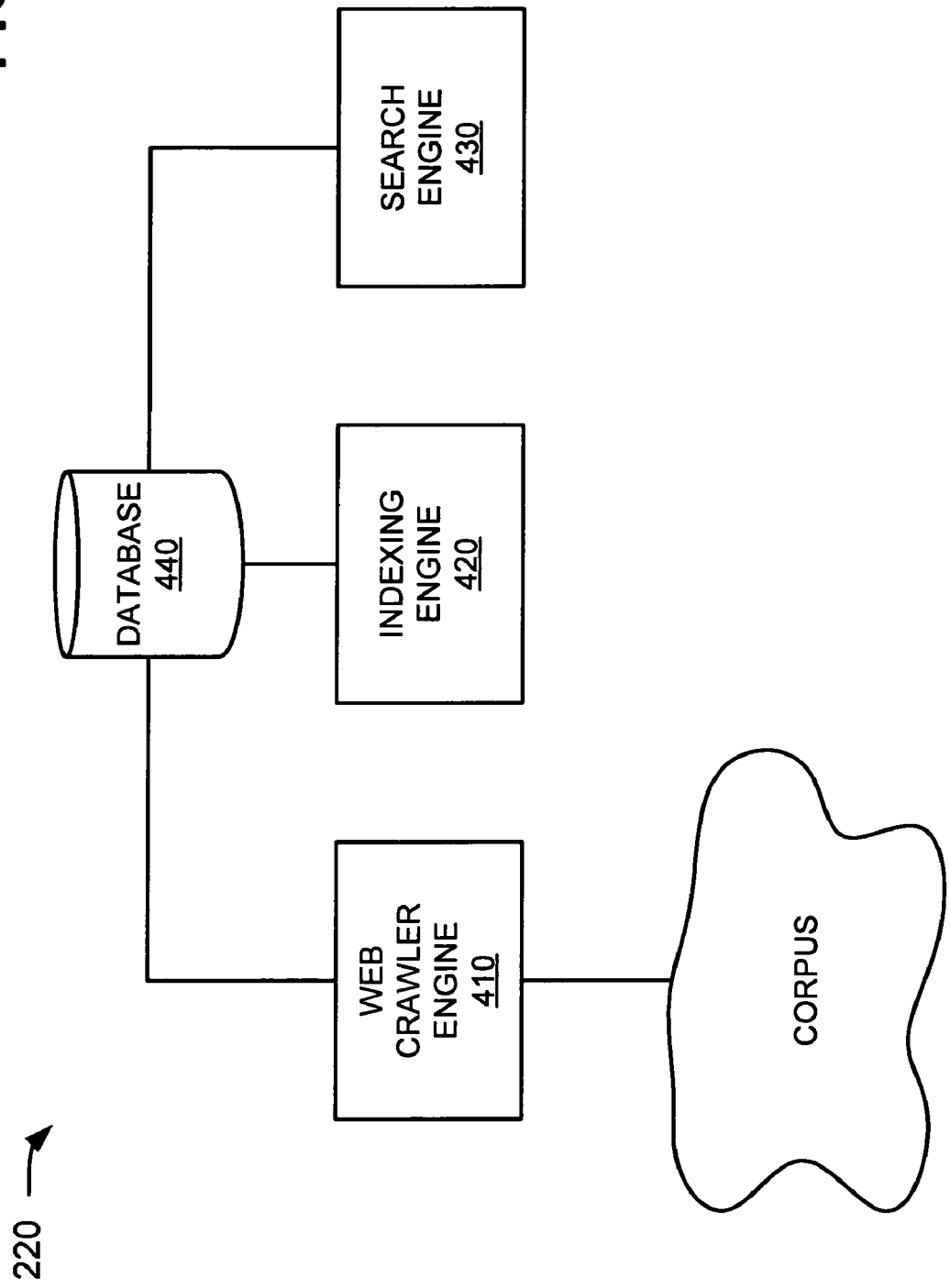
FIG. 4 is an exemplary functional block diagram of a portion of the search engine system of FIG. 2 according to an implementation consistent with the principles of the invention.

FIG. 4 is an exemplary functional block diagram of a portion of search engine system 220 according to an implementation consistent with the principles of the invention. Search engine system 220 may include a web crawler engine 410, an indexing engine 420, and a search engine 430 connected to a database 440. In one implementation, web crawler engine 410, indexing engine 420, and/or search engine 430 may be implemented by software and/or hardware within search engine system 220. In another implementation, web crawler engine 410, indexing engine 420, and/or search engine 430 may be implemented by software and/or hardware within another device or a group of devices separate from or including search engine system 220.

Generally, web crawler engine 410 may operate from a list of addresses to fetch the corresponding documents from a corpus of documents (e.g., the web). Web crawler engine 410 may determine whether a fetched document is a near-duplicate of a previously-fetched document. When the fetched document is a near-duplicate of a previously-fetched document, web crawler engine 410 may discard the document and not crawl the outgoing links in the document. When the fetched document is not a near-duplicate of a previously-fetched document, web crawler engine 410 may extract the addresses (e.g., URLs) associated with the outgoing links in the document and add the addresses to the list of addresses to be crawled. Web crawler engine 410 may also store information associated with the document, such as all or part of the document, in database 440.

Indexing engine 420 may operate upon documents crawled by web crawler engine 410. For example, indexing engine 420 may create an index of the documents and store the index in database 440. Indexing engine 420 may update the index as new documents are crawled and added to database 440.

Search engine 430 may identify documents that are relevant to a user's search query. For example, search engine 430 may search the index in database 440 based on a search query. Search engine 430 may score or rank documents identified by the search, sort the documents based on their scores, and form search results based on the sorted documents.

Database 440 may be embodied within a single memory device or within multiple (possibly distributed) memory devices. Database 440 may store the list of addresses used by web crawler engine 410, information associated with documents crawled by web crawler engine 410, and/or the index generated by indexing engine 420.

Exemplary Functional Diagram of Web Crawler Engine

Figure 5:
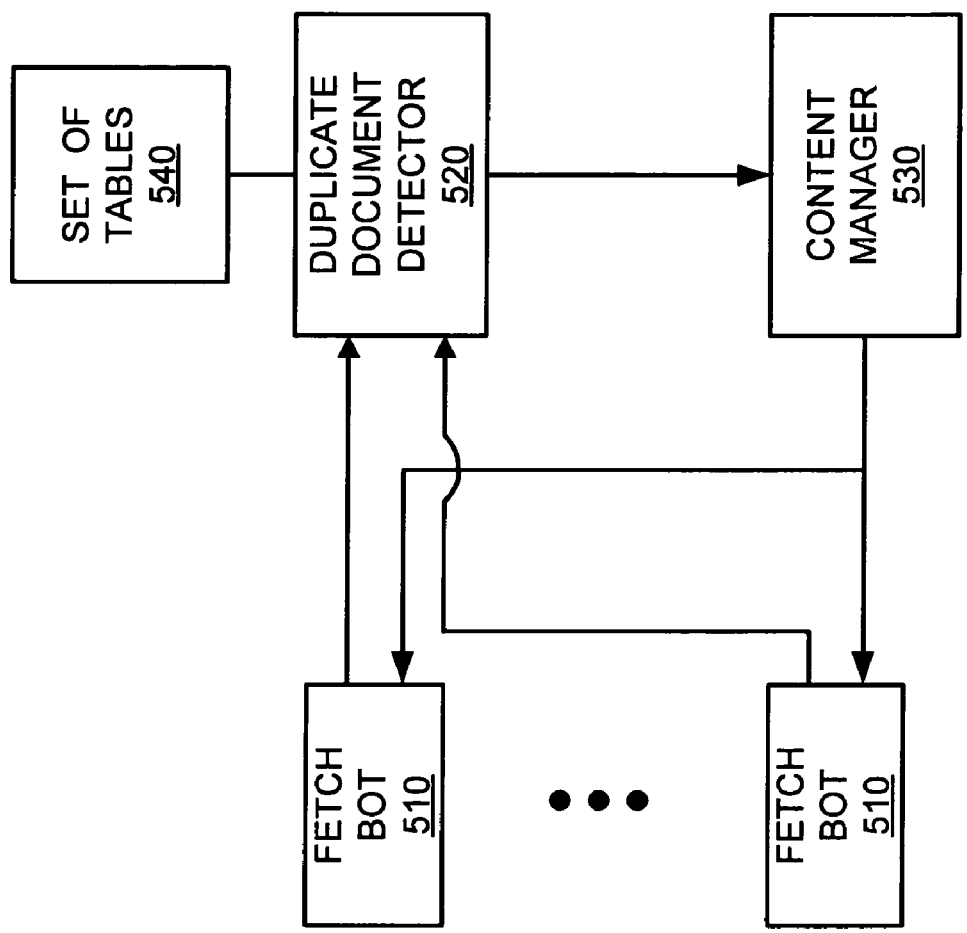
FIG. 5 is an exemplary functional block diagram of the web crawler engine of FIG. 4 according to an implementation consistent with the principles of the invention.

FIG. 5 is an exemplary functional block diagram of web crawler engine 410 according to an implementation consistent with the principles of the invention. In one implementation, web crawler engine 410 may be implemented by software and/or hardware within search engine system 220. In another implementation, web crawler engine 410 may be implemented by software and/or hardware within another device or a group of devices separate from or including search engine system 220.

Web crawler engine 410 may include fetch bots 510, duplicate document detector 520, content manager 530, and a set of tables 540. A fetch bot 510 may fetch a document from a corpus of documents and provide the fetched document to duplicate document detector 520. Duplicate document detector 520 may determine whether the fetched document is a near-duplicate of a previously-fetched document based on information in tables 540.

In one implementation, duplicate document detector 520 may determine an f-bit fingerprint (e.g., hash value) for the fetched document using any hashing technique that maps similar documents to similar hash values, provided that the hashing technique has the following property: the f-bit fingerprints of two near-duplicate documents should differ in very few bits. An exemplary hashing technique that satisfies this property includes simhash described in M. Charikar, "Similarity Estimation Techniques from Rounding Algorithms," Proc. 34th Annual ACM Symposium on Theory of Computing, May 19-21, 2002, Montreal, Quebec, Canada, which is incorporated herein by reference. Mapping similar documents to similar hash values is atypical of standard hashing techniques. For example, cryptographic hashing techniques, such as SHA-1 and MD5, map similar documents to completely different hash values.

To determine the fingerprint of a document according to one exemplary hashing technique, duplicate document detector 520 may extract a set of features from the document. A document feature might include any token in the document, where a "token" may include a sequence of one or more alphanumeric characters. Accordingly, features may include words, numbers, acronyms, stems of words, synonyms of words, etc. It may be beneficial to avoid including some words as features, such as stop words (e.g., "a," "the," "of," etc.) and other words that are unimportant to the document's content. In one implementation, a weight may be associated with a feature. A weight associated with a more important feature, such as a word in a title of the document, may be higher than a weight associated with a less important feature, such as a word appearing in an advertisement in the document.

The f-bit fingerprint may be generated for the entire document based on the set of features that have been extracted from the document and their respective weights. For example, a feature associated with a higher weight may influence the fingerprint for the document more than a feature associated with a lower weight.

Once duplicate document detector 520 determines the fingerprint for the fetched document, duplicate document detector 520 may identify whether any existing fingerprint differs from the fingerprint of the fetched document in at most k-bit positions based on information in tables 540. In one implementation, k may be a small integer (i.e., small in relation to the number of bits in the fingerprint). The integer k may also be referred to as the Hamming distance.

Figure 6:
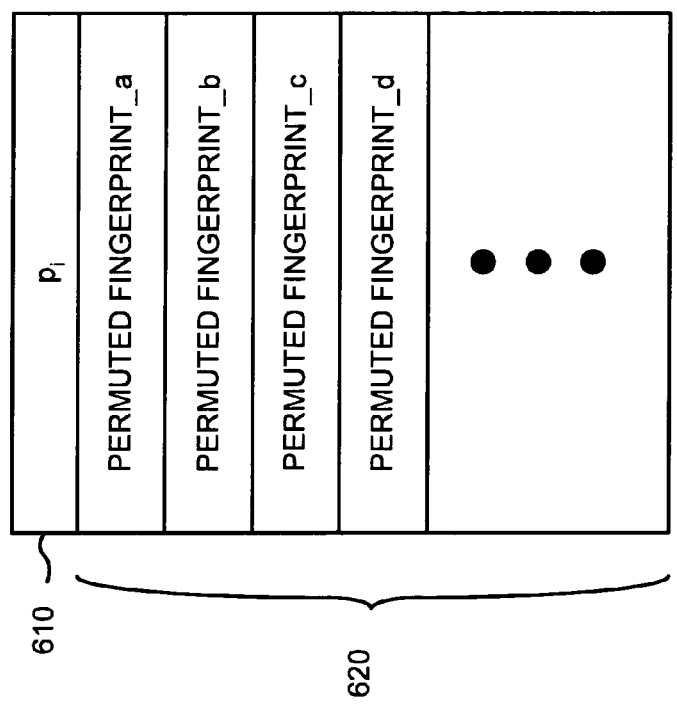
FIG. 6 is an exemplary diagram of a table $T_i$ of the set of tables of FIG. 5 according to an implementation consistent with the principles of the invention.

Tables 540 may include a set of t tables: $T_1, T_2, \ldots, T_t$. FIG. 6 is an exemplary diagram of a table $T_i$ (where $1 \leq i \leq t$) of the set of tables 540 according to an implementation consistent with the principles of the invention. Table $T_i$ may include two quantities: an integer $p_i$ 610 and a set of N permuted fingerprints 620 (where N may refer to the number of unique documents that have been previously fetched). Integer $p_i$ 610 may be used when probing table $T_i$, as described below.

Permuted fingerprints 620 may be generated by applying a permutation $x_i$ to fingerprints associated with previously fetched documents. For a 32-bit fingerprint, for example, one possible permutation $x_i$ may include [17, 18, 19, 20, 21, 22, 23, 24, 25, 26, 27, 28, 29, 30, 31, 32, 1, 2, 3, 4, 5, 6, 7, 8, 9, 10, 11, 12, 13, 14, 15, 16], where "17" means that the 17th bit of the 32-bit fingerprint is moved to the first bit position, "18" means that the 18th bit of the 32-bit fingerprint is moved to the second bit position, "19" means that the 19th bit of the 32-bit fingerprint is moved to the third bit position, etc. When this permutation is applied to the 32-bit fingerprint 11111111111111110000000000000000, the following permuted fingerprint is obtained: 00000000000000001111111111111111. In other words, in this example, the 17th through 32nd bits ("1") are moved to bit positions 1-16, and the 1st through 16th bits ("0") are moved to bit positions 17-32. Another possible permutation for a 32-bit fingerprint may include [17, 18, 19, 20, 21, 22, 23, 24, 1, 2, 3, 4, 5, 6, 7, 8, 25, 26, 27, 28, 29, 30, 31, 32, 9, 10, 11, 12, 13, 14, 15, 16]. When this permutation is applied to the 32-bit fingerprint 11111111111111110000000000000000, the following permuted fingerprint may is obtained: 00000000111111110000000011111111.

The resulting set of permuted fingerprints 620 may be sorted and compressed to save space. In one implementation, a delta-encoding scheme may be used to maintain just the XOR between successive permuted fingerprints.

The number t of tables T may be a design decision. Different design choices for t may result in different values for $p_i$. In one implementation, let X(f, k, d) refer to the number of tables for $2^d$ documents with f-bit fingerprints and Hamming distance k. In this case, $$X(f, k, d) = \begin{cases} 1 & \text{if } d < \text{threshold} \\ \min_{r>k} \binom{r}{k} * X\left(\frac{fk}{r}, k, d - \frac{(r-k)f}{r}\right) & \text{otherwise} \end{cases}$$

if d<threshold otherwise, where r may refer to the set of all integers greater than k.

Returning to FIG. 5, duplicate document detector 520 may apply permutations $x_1, x_2, \ldots, x_t$ to the fingerprint (F) associated with the fetched document to obtain corresponding permuted fingerprints $x_1(F), x_2(F), \ldots, x_t(F)$. For each permuted fingerprint $x_i(F)$, duplicate document detector 520 may identify all permuted fingerprints in table $T_i$ whose top (e.g., most significant) $p_i$ bit positions match the top $p_i$ bit positions of $x_i(F)$. In another implementation, a sequence of bits other than the top (most significant) bits may be used to identify a match.

For each of the identified permuted fingerprints in table $T_i$ (for each value of i), duplicate document detector 520 may determine whether it is substantially similar to the permuted fingerprint $x_i(F)$. In one implementation, a permuted fingerprint is substantially similar to the permuted fingerprint $x_i(F)$ if it differs from the permuted fingerprint $x_i(F)$ in at most k bit positions.

For any permuted fingerprint that is substantially similar to the permuted fingerprint $x_i(F)$, duplicate document detector 520 may identify the fetched document as a near-duplicate of the previously-fetched document associated with the substantially similar permuted fingerprint.

When duplicate document detector 520 determines that the fetched document is a near-duplicate of a previously-fetched document, duplicate document detector 520 may discard the fetched document. When duplicate document detector 520 determines that the fetched document is not a near-duplicate of a previously-fetched document, duplicate document detector 520 may provide the fetched document to content manager 530. Alternatively, duplicate document detector 520 may provide the fetched document to content manager 530 regardless of whether the fetched document is a near-duplicate of a previously-fetched document. Duplicate document detector 520 may also store the permuted fingerprint $x_i(F)$ associated with the fetched document in table $T_i$ (for each value of i).

When the fetched document is a near-duplicate of a previously fetched document and duplicate document detector 520 provides the fetched document to content manager 530, content manager 530 may ignore the outgoing links in the fetched document. When the fetched document is not a near-duplicate of a previously-fetched document, content manager 530 may parse the fetched document to determine the outgoing links that the fetched document contains. Content manager 530 may add addresses associated with the outgoing links to a list of addresses that it maintains. Content manager 530 may provide addresses from the list to fetch bots 510 as instructions for fetch bots 510 to fetch (i.e., crawl) the corresponding documents. Content manager 530 may also store information associated with the fetched document (e.g., all or part of the fetched document) in database 440 (FIG. 4).

Figure 7:
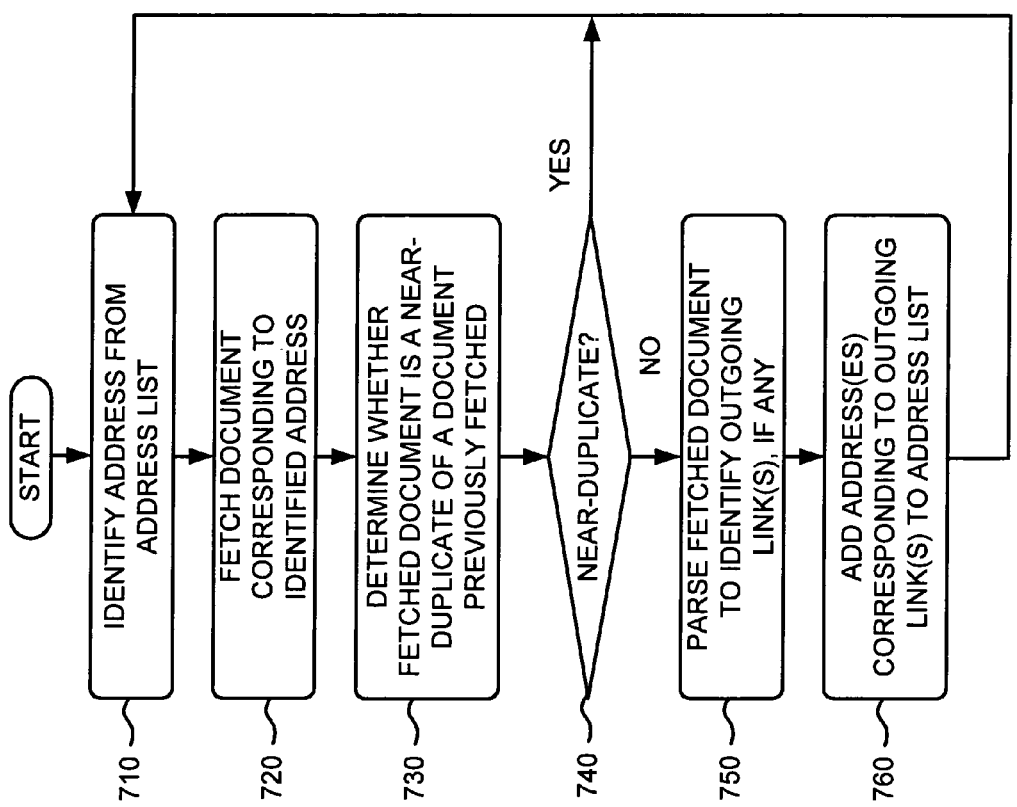
FIG. 7 is a flowchart illustrating an exemplary crawling operation according to an implementation consistent with the principles of the invention.

FIG. 7 is a flowchart illustrating an exemplary crawling operation according to an implementation consistent with the principles of the invention. In one implementation, the exemplary processing of FIG. 7 may be performed by web crawler engine 410. In another implementation, the exemplary processing of FIG. 7 may be performed by one or more other components, possibly in conjunction with web crawler engine 410.

Processing may begin with identification of an address (e.g., a URL) from an address list (block 710). In one implementation, the address list may correspond to the list of addresses maintained by content manager 530 (FIG. 5). A document corresponding to the identified address may be fetched (block 720). For example, the address may be used to identify a document in a corpus of documents (e.g., the web) and the contents of this document may be fetched.

Figure 8:
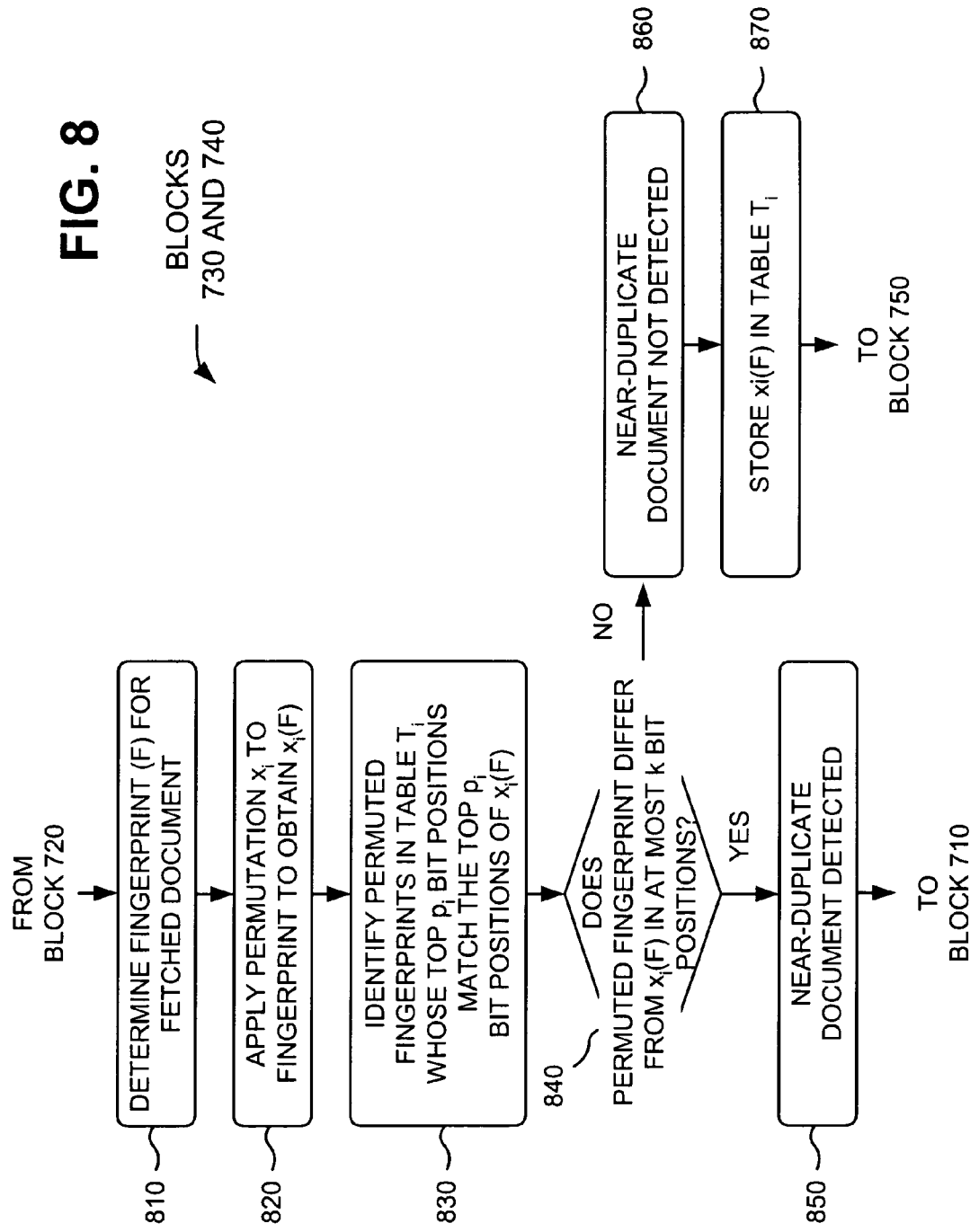
FIG. 8 is a flowchart illustrating exemplary processing for determining whether a document is a near-duplicate document according to an implementation consistent with the principles of the invention.

It may be determined whether the fetched document is a near-duplicate of a document that was previously fetched (blocks 730 and 740). FIG. 8 is a flowchart illustrating exemplary processing for determining whether a document is a near-duplicate document according to an implementation consistent with the principles of the invention. In one implementation, the exemplary processing of FIG. 8 may be performed by web crawler engine 410. In another implementation, the exemplary processing of FIG. 8 may be performed by one or more other components, possibly in conjunction with web crawler engine 410.

Processing may begin with determination of a fingerprint (F) for the fetched document (block 810). In one implementation, as described above, a set of features may be extracted from the fetched document and a weight may be associated with each feature in the set of features. The fingerprint F may then be generated for the fetched document based on the set of features and their respective weights. As described above, a hashing technique may be used to generate the fingerprint F, where the hashing technique satisfies the following property: the f-bit fingerprints of two near-duplicate documents should differ in very few bits.

A permutation $x_i$ (for each value of i, $1 \leq i \leq t$) may be applied to the fingerprint F associated with the fetched document to obtain a corresponding permuted fingerprint $x_i(F)$ (block 820). For each permuted fingerprint $x_i(F)$, permuted fingerprints in table $T_i$ whose top $p_i$ bit positions match the top $p_i$ bit positions of $x_i(F)$ may be identified (block 830). In other words, for permuted fingerprint $x_1(F)$, permuted fingerprints in table $T_1$ whose top $p_1$ bit positions match the top $p_1$ bit positions of $x_1(F)$ may be identified; for permuted fingerprint $x_2(F)$, permuted fingerprints in table $T_2$ whose top $p_2$ bit positions match the top $p_2$ bit positions of $x_2(F)$ may be identified; and so on.

For each of the identified permuted fingerprints in table $T_i$ (for each value of i), it may be determined whether the identified permuted fingerprint differs from the permuted fingerprint $x_i(F)$ in at most k bit positions (block 840). When an identified permuted fingerprint differs from the permuted fingerprint $x_i(F)$ in at most k bit positions, the fetched document (corresponding to permuted fingerprint $x_i(F)$) may be identified as a near-duplicate of the previously fetched document (corresponding to the identified permuted fingerprint) (block 850).

When no identified permuted fingerprint differs from the permuted fingerprint $x_i(F)$ (for each value of i) in at most k bit positions, the fetched document may be identified as not being a near-duplicate of any previously fetched document (block 860). In this case, the permuted fingerprint $x_i(F)$ may be stored in table $T_i$ (for each value of i) (block 870). In other words, permuted fingerprint $x_1(F)$ may be stored in table $T_1$, permuted fingerprint $x_2(F)$ may be stored in table $T_2$, and so on.

Returning to FIG. 7, when the fetched document is determined to be a near-duplicate of a previously-fetched document (block 740—YES), the fetched document may be discarded. In this case, the fetched document may not be indexed and/or may not have its outgoing links extracted for crawling. Processing may then continue with the identification of another address from the address list (block 710).

When the fetched document is determined not to be a near-duplicate of a previously-fetched document (block 740—NO), the fetched document may be parsed to identify its outgoing links, if there are any (block 750). Any conventional technique may be used to identify outgoing links in the document. An address (e.g., a URL) associated with an identified outgoing link may be added to the address list (block 760). Processing may then continue with the identification of another address from the address list (block 710).

While the acts associated with blocks 710-760 have been described in a sequential manner, at least some of the acts may occur concurrently or in a different order. For example, a first document may be parsed to identify its outgoing links, while a second document is being processed to determine whether it is a near-duplicate of a previously fetched document, while a third document is being fetched.

EXAMPLE

Figure 9:
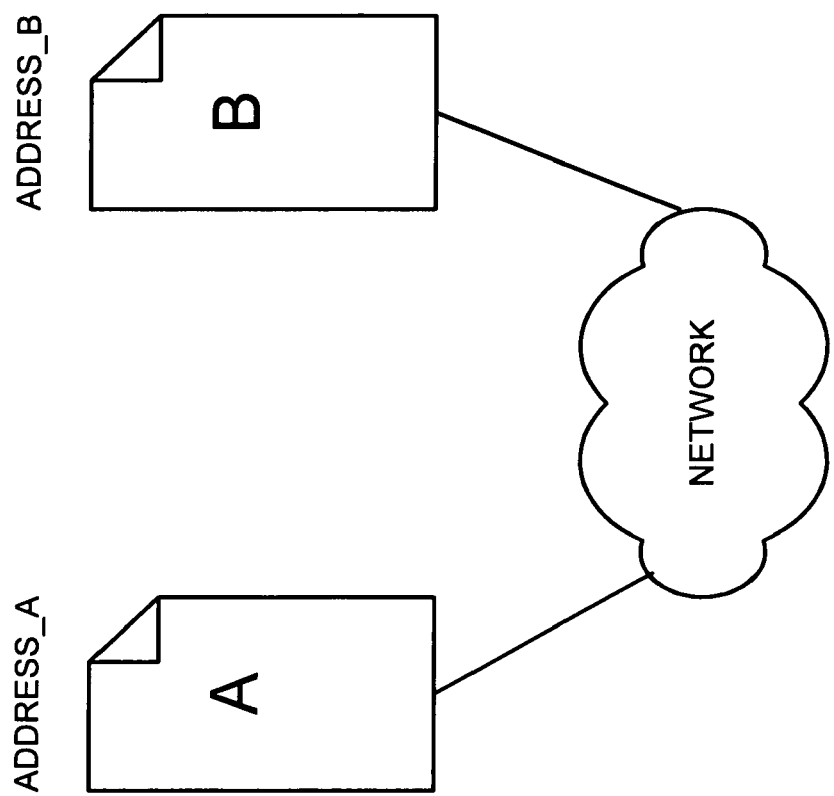
FIGS. 9-11 are diagrams that illustrate exemplary processing according to an implementation consistent with the principles of the invention.
Figure 10:
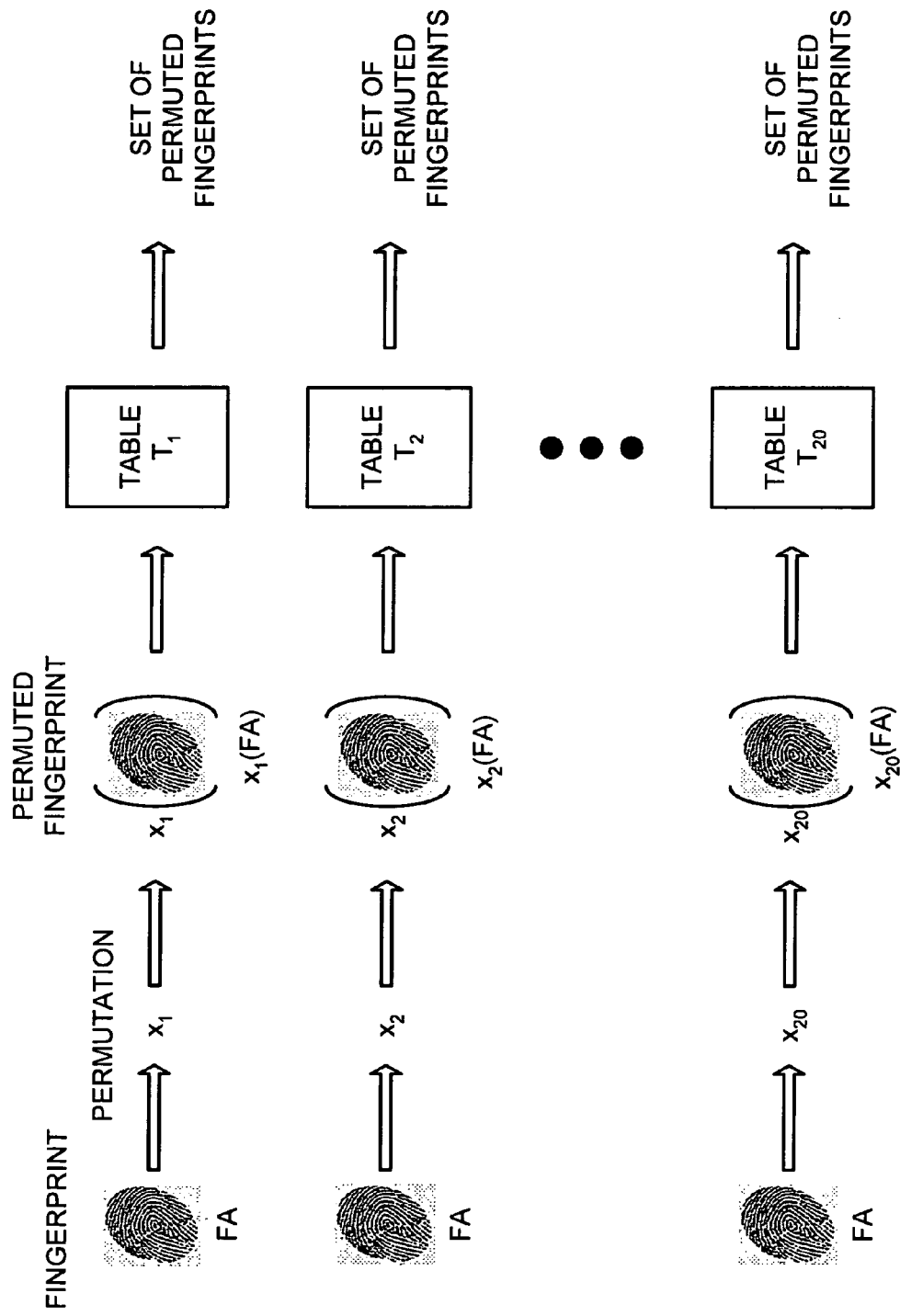
Figure 11:
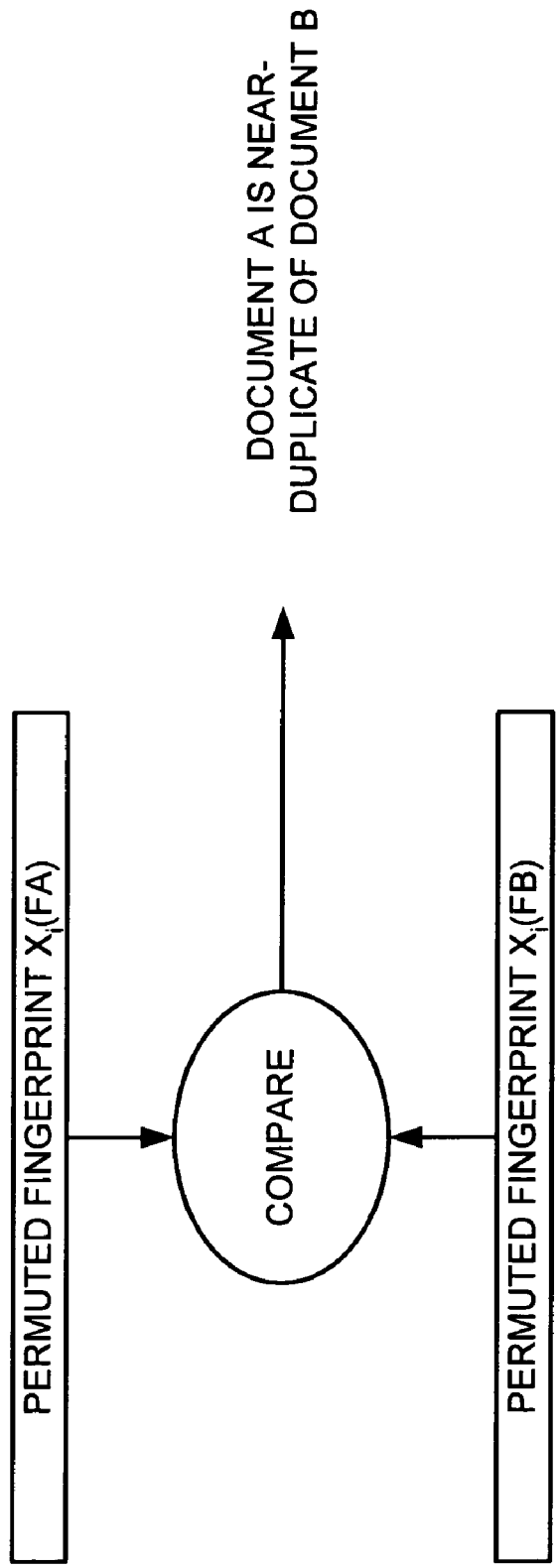

FIGS. 9-11 are diagrams that illustrate exemplary processing according to an implementation consistent with the principles of the invention. As shown in FIG. 9, assume that a network includes two documents: document A and document B. Document A is stored at an address, address_A, and document B is stored at a different address, address_B. Assume that documents A and B include identical content except for the advertisements that they present. Accordingly, documents A and B are near-duplicates of each other. Assume that document B has been previously fetched and document A is currently under consideration during the crawling process.

As shown in FIG. 10, a fingerprint FA may be determined for document A. In this example, assume that the fingerprint FA includes 64 bits (i.e., f=64). Assume also that there are 20 tables $T_1, T_2, \ldots, T_{20}$ (i.e., t=20), that there are $2^{34}$ permuted fingerprints, associated with $2^{34}$ documents, stored in each of the tables T (i.e., d=34), and it is desired to identify permuted fingerprints that differ from a given permuted fingerprint in at most 3 bit positions (i.e., k=3). To determine a value for p, the 64 bits of a fingerprint may be split into 6 blocks having 11, 11, 11, 11, 10, and 10 bits, respectively. There are $$\binom{6}{3} = 20$$

ways of choosing 3 out of these 6 blocks. For each such choice, permutation x may cause the bits lying in the chosen blocks to be the leading bits. There may be several such permutations that can be used. The value of p may be the total number of bits in the chosen blocks. Thus, p may be equal to 31, 32, or 33.

As shown in FIG. 10, permutations $x_1, x_2, \ldots, x_{20}$ may be applied to fingerprint FA to obtain permuted fingerprints $x_1(FA), x_2(FA), \ldots, x_{20}(FA)$. Each of permuted fingerprints $x_1(FA), x_2(FA), \ldots, x_{20}(FA)$ may be compared to permuted fingerprints in the corresponding one of tables $T_1, T_2, \ldots, T_{20}$ to identify a set of permuted fingerprints whose top p (e.g., 31) bit positions match the top p (e.g., 31) bit positions of the corresponding one of $x_1(FA), x_2(FA), \ldots, x_{20}(FA)$.

It may then be determined whether any permuted fingerprint in the set of permuted fingerprints associated with a particular table $T_i$ differs from the permuted fingerprint $x_i(FA)$ in at most 3 bits. Assume that one of the permuted fingerprints in the set of permuted fingerprints for table $T_i$ is associated with document B (e.g., $x_i(FB)$). As shown in FIG. 11, the bits of permuted fingerprint $x_i(FA)$ may be compared to the bits of permuted fingerprint $x_i(FB)$ to determine whether permuted fingerprint $x_i(FA)$ differs from permuted fingerprint $x_i(FB)$ in at most 3 bits. Assume that permuted fingerprint $x_i(FA)$ differs from permuted fingerprint $x_i(FB)$ in 2 bits. Accordingly, document A may be determined to be a near-duplicate of document B.

Based on this determination, document A may be discarded and the outgoing links of document A may not be crawled.

Batch Mode

In an implementation consistent with the principles of the invention, the duplicate document detection techniques described above may be performed in a batch mode by a group of devices. FIG. 12 is an exemplary diagram of a batch mode processing system 1200 according to an implementation consistent with the principles of the invention. In one implementation, batch mode processing system 1200 may be implemented by software and/or hardware within a group of devices implemented by, separate from, or including search engine system 220 (FIG. 2).

System 1200 may include a coordinator 1210, a group of devices 1220, and a table 1230. Table 1230 may include f-bit fingerprints associated with a large set of previously fetched documents (e.g., $10 \times 10^9 = 10$ billion or more fingerprints). Table 1230 may be maintained by devices 1220. In one implementation, each device 1220 may be responsible for a portion of table 1230.

Coordinator 1210 may receive a batch of newly-fetched documents (e.g., $1 \times 10^6 = 1$ million or more documents). For each fetched document in the batch, coordinator 1210 may determine a fingerprint for the document in a manner similar to that described above. Coordinator 1210 may broadcast the fingerprints of fetched documents in the batch to devices 1220.

Each device 1220 may create t tables $T_1, T_2, \ldots, T_t$ 1222. Alternatively, coordinator 1210 may create tables 1222 and broadcast them to devices 1220. Two quantities may be associated with each of tables 1222 (e.g., table $T_i$): an integer $p_i$ and a permutation $x_i$ over f bit-positions. Device 1220 may create table $T_i$ by applying permutation $x_i$ to each fingerprint in the batch of fingerprints received from coordinator 1210.

Each device 1220 may apply a permutation x to each fingerprint F in table 1230 (or each fingerprint F for which device 1220 is responsible). For example, for each i=1, 2, . . . , t, device 1220 may determine $x_i(F)$ by applying permutation $x_i$ to fingerprint F. Device 1220 may then probe table $T_i$ to identify any permuted fingerprints in table $T_i$ whose top $p_i$ bit positions match the top $p_i$ bit positions of $x_i(F)$. For each the identified permuted fingerprints, device 1220 may determine if the identified permuted fingerprint differs from permuted fingerprint $x_i(F)$ in at most k bit positions. If so, device 1220 may mark that permuted fingerprint in table $T_i$ as "bad." Device 1220 may also inform coordinator 1210 that the corresponding fingerprint is "bad" (i.e., associated with a near-duplicate of a previously fetched document).

When all the devices in group of devices 1220 have finished processing the fingerprints in the batch and reported their results to coordinator 1210, coordinator 1210 may divide the batch of fingerprints in the batch into two groups: "bad" (i.e., a near-duplicate) and "not-bad" (i.e., not a near-duplicate). Coordinator 1210 may add those fingerprints that are marked "not-bad" to table 1230. The documents associated with these fingerprints, which are identified as not being a near-duplicate of a previously fetched document, may be processed as described above. Documents associated with fingerprints marked as "bad," which are identified as a near-duplicate of a previously fetched document, may be processed (or perhaps more appropriately not processed) as described above.

CONCLUSION

Systems and methods consistent with the principles of the invention may improve the efficiency of a crawling operation by detecting and discarding near-duplicate documents. Two factors motivated the techniques described herein: (1) the number of documents is very large; and (2) the time allowed for identifying a newly-fetched document as a near-duplicate is small. Based on the techniques described herein, billions of documents can be processed and approximately one million or more documents can be crawled and analyzed (for duplicates) in about one minute.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 7 and 8, the order of the acts may be modified in other implementations consistent with the principles of the invention. Further, non-dependent acts may be performed in parallel.

Also, it has been described that duplicate document detection may be performed in real-time during the crawling process. In other implementations, it may be possible to perform the duplicate document detection in an offline mode. In this case, when a near-duplicate document is detected, addresses associated with its outgoing links may be deleted from the address table (if they have not already been crawled).

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more devices, the method comprising:

crawling, by at least one of the one or more devices, a document;

determining, by at least one of the one or more devices, a fingerprint for the crawled document;

identifying, by at least one of the one or more devices, fingerprints of a set of stored fingerprints with bits in a sequence of bit positions that match bits in a corresponding sequence of bit positions of the fingerprint, where the sequence of bit positions is less than all of the bit positions in the identified fingerprints;

determining, by at least one of the one or more devices, whether one of the identified fingerprints is substantially similar to the fingerprint based on whether the one of the identified fingerprints differs from the fingerprint in at most k bits, where k is an integer greater than zero; and identifying, by at least one of the one or more devices, the crawled document as a near-duplicate of another document when the one of the identified fingerprints is substantially similar to the fingerprint.

2. The method of claim 1, wherein determining a fingerprint for the crawled document includes:
   extracting a set of features from the crawled document, assigning a weight to each of the features, and
   determining the fingerprint for the crawled document based on the set of features and the assigned weights.

3. The method of claim 2, wherein the set of features do not include stop words in the crawled document.

4. The method of claim 2, wherein a weight assigned to a more important one of the features is higher than a weight assigned to a less important one of the features.

5. The method of claim 2, wherein a feature with a higher assigned weight influences the fingerprint more than a feature with a lower assigned weight.

6. The method of claim 1, further comprising:
   storing the set of stored fingerprints in each of a plurality of tables.

7. The method of claim 6, wherein storing the set of stored fingerprints in each of a plurality of tables includes:
   applying a plurality of permutations to each of the fingerprints in the set of stored fingerprints, and
   storing, in each of the tables, the set of stored fingerprints to which a corresponding one of the permutations has been applied.

8. The method of claim 1, further comprising:
   ignoring outgoing links in the crawled document when the crawled document is identified as a near-duplicate of another document.

9. The method of claim 1, further comprising:
   identifying the crawled document as not being a near-duplicate of another document when none of the identified fingerprints is substantially similar to the fingerprint; and
   extracting outgoing links from the crawled document for crawling.

10. The method of claim 9, further comprising:
    storing the fingerprint with the set of stored fingerprints when the crawled document is identified as not being a near-duplicate of another document.

11. A system implemented within one or more computer devices, comprising:
    means for generating a hash value for a fetched document;
    means for comparing the hash value with a set of stored hash values to identify one or more of the stored hash values with bits in a sequence of bit positions that match bits in a corresponding sequence of bit positions of the hash value, where the sequence of bit positions is less than all of the bit positions in the identified hash values;
    means for determining that one of the identified hash values is substantially similar to the hash value when the one of the identified hash values differs from the hash value in less than a threshold number of bits; and
    means for identifying the fetched document as a near-duplicate of another document when the one of the identified hash values is substantially similar to the hash value.

12. A system comprising:
    a memory to store a plurality of fingerprints associated with a plurality of previously-crawled documents; and
    a processor to:
      crawl a document,
      generate a fingerprint for the crawled document,
      apply a number of permutations to the fingerprint to generate a plurality of permuted fingerprints,
      for each of the permuted fingerprints, determine whether bits associated with one of the fingerprints in the memory differ from bits associated with the permuted fingerprint in at most k bit positions, where k is an integer greater than zero, and
      identify the crawled document as a near-duplicate of one of the previously-crawled documents corresponding to the one of the fingerprints when the bits associated with the one of the fingerprints differ from the bits associated with one of the permuted fingerprints in at most the k bit positions.

13. The system of claim 12, wherein when generating a fingerprint for the crawled document, the processor is configured to:
    extract a set of features from the crawled document,
    assign a weight to each of the features, and
    determine the fingerprint for the crawled document based on the set of features and the assigned weights.

14. The system of claim 13, wherein the set of features do not include stop words in the crawled document.

15. The system of claim 13, wherein a weight assigned to a more important one of the features is higher than a weight assigned to a less important one of the features.

16. The system of claim 13, wherein one of the features with a higher assigned weight influences the fingerprint more than another one of the features with a lower assigned weight.

17. The system of claim 12, wherein the memory includes a plurality of tables; and
    wherein the processor is further configured to:
      apply a plurality of permutations to each of the fingerprints associated with the plurality of previously-crawled documents, and
      store, in each of the tables, the fingerprints to which a corresponding one of the permutations has been applied.

18. The system of claim 12, wherein the processor is further configured to:
    identify one or more of the fingerprints in the memory that include a string of bits that matches a corresponding string of bits of each of the permuted fingerprints.

19. The system of claim 12, wherein the processor is further configured to:
    ignore outgoing links in the crawled document when the crawled document is identified as a near-duplicate of one of the previously-crawled documents.

20. The system of claim 12, wherein the processor is further configured to:
    identify the crawled document as not being a near-duplicate of one of the previously-crawled documents when none of the identified fingerprints is substantially similar to one of the permuted fingerprints, and
    extract outgoing links from the crawled document for crawling.

21. The system of claim 20, wherein the processor is further configured to:
    store the fingerprint in the memory when the crawled document is identified as not being a near-duplicate of one of the previously-crawled documents.

22. A system comprising:
    a first table to store a plurality of fingerprints associated with a plurality of documents;
    a coordinator to:
      receive a plurality of new documents,
      determine fingerprints for the new documents, and
      broadcast the fingerprints; and
    a plurality of devices to receive the broadcast fingerprints and maintain the first table, where each of the devices is configured to:
      create a second table based on the broadcast fingerprints, determine whether a fingerprint in a set of the fingerprints from the first table is substantially similar to one of the broadcast fingerprints in the second table by:
  identifying ones of the broadcast fingerprints, in the second table, that include a sequence of bits that match a corresponding sequence of bits of the fingerprint, and
  determining whether bits, associated with one of the identified broadcast fingerprints in the second table, differ from bits associated with the fingerprint in at most k bit positions, where k is an integer greater than zero, and
identify the one of the broadcast fingerprints as being associated with a near-duplicate document when a fingerprint in the set of the fingerprints from the first table is substantially similar to the one of the broadcast fingerprints in the second table.

23. The system of claim 22, wherein when receiving a plurality of new documents, the coordinator is configured to fetch the plurality of new documents during a crawl operation.

24. The system of claim 22, wherein the second table includes a plurality of second tables; and
  wherein when creating a second table, each of the devices is configured to:
  apply a plurality of permutations to each of the broadcast fingerprints, and
  store, in each of the tables, the broadcast fingerprints to which a corresponding one of the permutations has been applied.

25. The system of claim 22, wherein the coordinator is further configured to:
  receive information from the devices regarding at least one of the broadcast fingerprints that is associated with a near-duplicate document, and
  discard the near-duplicate document without extracting outgoing links in the near-duplicate document.

26. The system of claim 25, wherein the coordinator is further configured to:
  receive information from the devices regarding at least one of the broadcast fingerprints that is associated with a near-duplicate document, and
  add at least one other one of the broadcast fingerprints to the first table.

27. A computer-readable memory device that includes computer-executable instructions, comprising:
  instructions for fetching a document;
  instructions for generating a fingerprint for the fetched document;
  instructions for applying a plurality of permutations to the fingerprint to generate a plurality of permuted fingerprints;
  instructions for comparing each of the permuted fingerprints to a set of stored fingerprints, corresponding to a plurality of other documents, to identify one or more of the stored fingerprints that include bits in a sequence of bit positions that match bits in a corresponding sequence of bit positions of the permuted fingerprint, where the sequence of bit positions is less than all of the bit positions in the identified fingerprints;
  instructions for determining whether one of the identified fingerprints differs from one of the permuted fingerprints in less than a threshold number of bits; and
  instructions for identifying the fetched document as a near-duplicate of one of the other documents when the one of the identified fingerprints differs from the one of the permuted fingerprints in less than the threshold number of bits.

* * * * *